Patented Oct. 10, 1922.

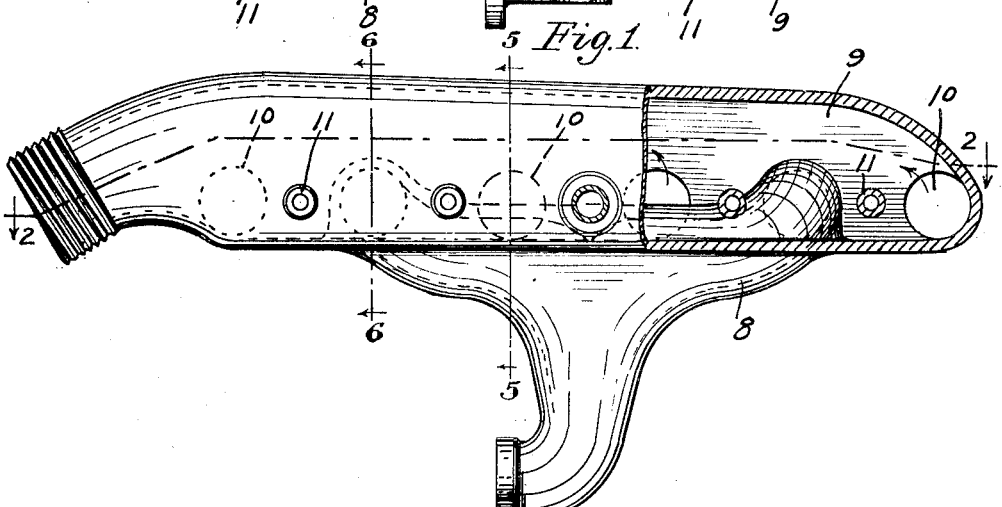

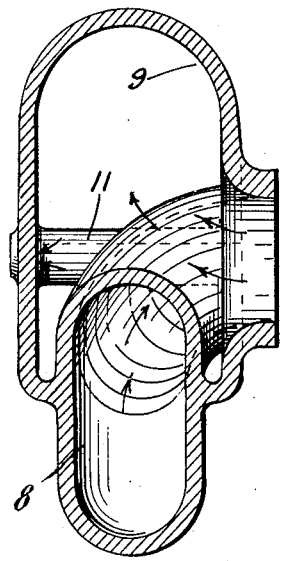
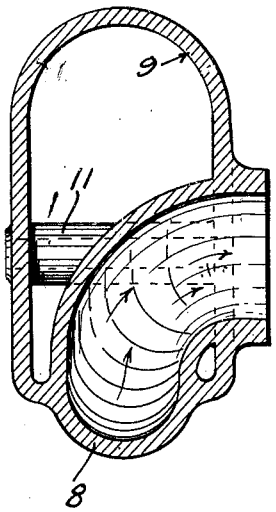
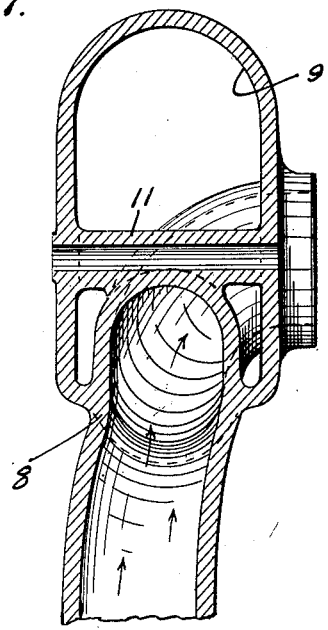

1,431,896

UNITED STATES PATENT OFFICE.

GEORGE B. RAIT, OF MINNEAPOLIS, MINNESOTA.

COMBINED INTAKE AND EXHAUST MANIFOLD.

Application filed May 3, 1919. Serial No. 294,439.

*To all whom it may concern:*

Be it known that I, GEORGE B. RAIT, a citizen of the United States, residing at Minneapolis, in the county of Hennepin and State of Minnesota, have invented certain new and useful Improvements in Combined Intake and Exhaust Manifolds; and I do hereby declare the following to be a full, clear, and exact description of the invention, such as will enable others skilled in the art to which it appertains to make and use the same.

My invention has for its object to provide an extremely simple, compact and highly efficient combined intake manifold and exhaust manifold, wherein the fuel is properly heated and vaporized by the exhaust just before the same enters the engine cylinders.

To the above end the invention consists of the novel devices and combinations of devices hereinafter described and defined in the claim.

In the accompanying drawings, which illustrate the invention, like characters indicate like parts throughout the several views.

Referring to the drawings:—

Fig. 1 is a view, partly in elevation and partly in central section, of the combined intake manifold and exhaust manifold;

Fig. 2 is a view in horizontal section taken on the irregular line 2—2 of Fig. 1;

Fig. 3 is a vertical section taken on the irregular line 3—3 of Fig. 4;

Fig. 4 is a view in horizontal section taken on the irregular line 4—4 of Fig. 3;

Fig. 5 is a view principally in transverse vertical section taken on the line 5—5 of Fig. 1 on an enlarged scale;

Fig. 6 is a view in transverse vertical section taken on the line 6—6 of Fig. 1 on an enlarged scale; and Fig. 7 is a view in transverse vertical section taken on the irregular line 7—7 of Fig. 3 on an enlarged scale.

The numeral 8 indicates an intake manifold, and the numeral 9 indicates an exhaust manifold, cast integral, the one with the other. The exhaust manifold 9 has in its side, next to the engine, to which it is applied, a plurality of bossed-openings 10, arranged to register with the exhaust ports of the engine. Bolts, not shown, detachably connect the combined intake and exhaust manifolds to the engine, and are inserted through sleeves 11. These sleeves extend transversely through the exhaust manifold 9, are cast integral with the two manifolds. The delivery end of the exhaust manifold 9 is screw threaded at 12 to receive a coupling, not shown, for connecting an exhaust pipe to said exhaust manifold.

The upper or top portion of the intake manifold is located within the exhaust manifold and forms a portion of the bottom thereof. The lower portion of the intake manifold is located outward of and below the exhaust manifold and is connected to the carburetor, not shown, in the customary manner. As best shown in Fig. 5, the sides of the intake manifold 8, within the exhaust manifold 9, are spaced apart from the sides thereof to subject the same to the hot gases passing through the exhaust manifold.

The delivery end portions of the arms of the intake manifold are curved to form elbows, located entirely within the exhaust manifold and spaced apart therefrom to permit the hot gases to pass completely therearound. The elbows of the intake manifold are extended through the same side of the exhaust manifold, in which the openings 10 are formed, and arranged to register with the intake ports of the engine.

From the above description it is evident that the fuel for the engine in traveling through the arms of the intake manifold is partially heated and vaporized by the heat from the hot exhaust gases in passing over and along the sides of that portion of said arms within the exhaust manifold. A continued movement of the fuel into the elbows of the arms of the exhaust manifold subjects the same to a greater heat for the reason that said elbows are entirely within the exhaust manifold and the hot gases pass completely therearound, thus further heating and vaporizing the fuel and preventing condensation at the time the fuel enters the engine cylinder. As previously stated, the combined intake manifold and exhaust manifold is extremely simple, easy to cast and apply or remove from a cylinder casting.

What I claim is:—

An integrally cast combined intake manifold and exhaust manifold, said intake manifold comprising a tubular body portion that extends longitudinally of the body of said exhaust manifold, the main body of the intake manifold being located below the exhaust manifold with its rounded upper portion extended upward into the exhaust manifold and forming a portion of the bottom thereof, said intake manifold having tubular elbow-like extremities that extend upward and laterally to one side wall of said exhaust manifold and are spaced from the top and bottom of the latter, so that the exhaust gases will pass completely around said elbow-like extremities.

In testimony whereof I affix my signature in presence of two witnesses.

GEORGE B. RAIT.

Witnesses:
CLARE DEMAREST,
HARRY D. KILGORE.